United States Patent
Ligameri et al.

(10) Patent No.: US 10,108,337 B2
(45) Date of Patent: Oct. 23, 2018

(54) INFORMATION HANDLING SYSTEM HYBRID KEYBOARD

(71) Applicant: Dell Products L.P., Round Rock, TX (US)

(72) Inventors: Mark R. Ligameri, Santa Rosa, FL (US); Michiel Sebastiaan Emanuel Petrus Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 15/186,980

(22) Filed: Jun. 20, 2016

(65) Prior Publication Data
US 2017/0364234 A1    Dec. 21, 2017

(51) Int. Cl.
   *G06F 3/048*     (2013.01)
   *G06F 3/02*     (2006.01)
   *G06F 3/0489*     (2013.01)
   *G06F 3/0488*     (2013.01)
   *G06F 3/0482*     (2013.01)
   *G06F 3/0484*     (2013.01)

(52) U.S. Cl.
   CPC .............. *G06F 3/0489* (2013.01); *G06F 3/02* (2013.01); *G06F 3/0482* (2013.01); *G06F 3/0488* (2013.01); *G06F 3/04845* (2013.01)

(58) Field of Classification Search
CPC ............................... G06F 3/041; G06F 3/0488
See application file for complete search history.

(56) References Cited

U.S. PATENT DOCUMENTS

| | | | |
|---|---|---|---|
| 2011/0047459 A1* | 2/2011 | Van Der Westhuizen | G06F 1/1692 715/702 |
| 2011/0216007 A1* | 9/2011 | Cheng | G06F 3/02 345/168 |
| 2011/0248947 A1* | 10/2011 | Krahenbuhl | G06F 1/1626 345/174 |
| 2012/0169623 A1* | 7/2012 | Grossman | G06F 3/0416 345/173 |
| 2014/0327628 A1* | 11/2014 | Tijssen | G06F 3/0484 345/173 |

* cited by examiner

*Primary Examiner* — Afroza Chowdhury
(74) *Attorney, Agent, or Firm* — Zagorin Cave LLP; Robert Holland

(57) ABSTRACT

An information handling system input device coordinates presentation of keyboard augmentation panels proximate a keyboard resting on a horizontally-disposed touchscreen display. The keyboard augmentation panels relate keyboard and other inputs to an application active on the information handling system to enhance end user interactions. A keyboard augmentation module tracks the keyboard position on the touchscreen display to adapt content presentation in the keyboard augmentation panels based upon expected end user inputs. In other embodiments, other physical devices are augmented to have hybrid graphical interfaces that enhance multi-hand end user interactions.

17 Claims, 13 Drawing Sheets

INFORMATION HANDLING SYSTEM HYBRID KEYBOARD

BACKGROUND OF THE INVENTION

Field of the Invention

The present invention relates in general to the field of information handling system input and output devices, and more particularly to an information handling system hybrid keyboard.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information provided by an end user through an input device, such as a keyboard, and provide information to the end user through an output device, such as display. In some instances, information handling systems integrate input/output (I/O) devices with a system housing. For example, portable information handling systems often accept inputs through integrated keyboards or touchscreens, such as physical keyboards integrated in convertible housings or virtual keyboards presented at a touchscreen of a planar tablet housing. Information handling systems also interface through peripheral I/O devices that are separate from the system housing, with communication supported through cables or wireless signals, such as wireless local area networks (WLAN) or wireless personal area networks (WPAN). Generally, desktop and other non-portable information handling systems are designed to interact with external peripheral devices, however, end users also appreciate the availability of external peripherals with portable information handling systems since portable system integrated I/O devices tend to have a smaller size. For example, end users will often use external peripherals in an office environment so that information is presented at multiple displays, including external peripheral flat panel displays that have a larger viewing area.

Touchscreen displays provide a convenient input device for end users by presenting graphical user interfaces that accept end user inputs as touches. In tablet information handling system configurations, a touchscreen display keyboard is the primary input device if a physical keyboard peripheral is not available. Although touchscreen keyboard displays provide a convenient interface for portable systems, end users often have difficulty typing at a touchscreen since no physical feedback is provided for key inputs. As a result, end users tend to use a physical keyboard peripheral to perform input-intensive activities. One difficulty with the use of peripheral keyboards is that applications often include settings and configurations that adjust how external keyboard inputs are applied. Often applications combine inputs from external keyboards with touch inputs or mouse inputs to perform application functions. For instance, a drawing application might accept graphical inputs made by a pen or mouse and apply different colors to the graphical inputs based on selection made in a menu. Similarly, a CAD application might rotate views based on keyed inputs, touch inputs or mouse inputs. Over time, end users are essentially trained by the applications to use various input combinations for performing functions, however, the input combinations tend to have inefficient hand movements. For example, an end user will type a selection to open and label a window, mouse a selection for a color to input at the window and then interactively draw on a touchscreen to create a graphic design. Instead of adapting to an end user and the end user's environment, the applications tend to force the end user to adapt to their environment.

SUMMARY OF THE INVENTION

Therefore, a need has arisen for a system and method which provides information handling system inputs and outputs that adapt to a usage model defined by the end user's interactions.

A further need exists for a system and method which provides multi-handed inputs to an information handling system that adapts to end user usage models.

In accordance with the present invention, a system and method are provided which substantially reduce the disadvantages and problems associated with previous methods and systems for managing end user inputs and outputs. A physical input device placed on a touchscreen display is augmented with graphical interfaces presented in coordination with the physical device. For example, a keyboard detected on the touchscreen display has input augmentation panels presented proximate the keyboard and tied to the keyboard position, with the augmentation panel content adapted to support keyboard functions, such as based on the keyboard position and/or an application running on the information handling system and using the keyboard to accept inputs. As another example, a totem placed on the touchscreen display at a non-dominant hand side results in presentation of an augmentation menu presented on a dominant hand side display presentation controlled by the totem that adapts inputs made by a dominant hand device, such as keyboard or stylus.

More specifically, an information handling system processes information with a processor and memory that accept end user inputs through input devices and present information output at display devices. A horizontally-disposed touchscreen display interfaces with the processor and memory to accept touch inputs and present outputs as visual images. A keyboard module executing on processing resources of the information handling system detects placement of a physical keyboard on the touchscreen display and, in response to detecting the keyboard, generates keyboard augmentation panels proximate to the position of the keyboard. The keyboard augmentation panels supplement keyboard operations by adjusting panel content to anticipated or actual keyboard inputs. Panels present content in zones that relate function input speed to panel locations so that more commonly used functions fall within an inner zone that has lesser hand motions to implement while less commonly used functions fall within an outer zone that has somewhat larger arm motions to implement. Augmentation panels collapse and expand based upon keyboard or other device position and selection to automatically adapt physical devices into hybrid physical and graphical devices. Augmentation panel presentation adapts to the hand dominance of an end user to enhance two-handed engagement of an end user with an input interface, such as by presenting menus driven by inputs of a totem located on a non-dominant hand side of a display at a side of the display associated with the end user's dominant hand.

The present invention provides a number of important technical advantages. One example of an important technical advantage is that a physical device that makes inputs to an information handling system has input functions augmented with graphical panels to provide a hybrid physical and virtual user interface. Placement of the physical device on a touchscreen display initiates presentation of the augmentation panels that manage operations of the physical device. In one example embodiment, a physical keyboard placed on a touchscreen display initiates presentation of augmentation panels that provide menus and input devices to supplement inputs made at the keyboard. For example, a menu located adjacent the keyboard is selected with a small end user hand movement to control presentation of a touchpad or a number pad, with the menu selection determining which of the touchpad or number is located in a primary zone next to the keyboard or a secondary zone more distal the keyboard. Keyboard augmentation panels adapt to the type of application running on an information handling system so that panel content more frequently used with a particular application is presented in a primary zone, resulting in more efficient end user interactions. End user efficiency is further enhanced by adapting augmentation panels to an end user's hand dominance. For example, a totem device placed on a non-dominant hand side of a display is available for user inputs with a non-dominant hand that drive menu selections presented on dominant hand side of the display and relating to use of a physical device with the dominant hand. Rather than training an end user to interact with an interface, the augmentation panels adapt to an end user, learning over time the end user's preferred interactions and encouraging improved efficiency with multi-handed inputs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Presentation of keyboard augmentation panels at a horizontally-disposed display enhances information handling system keyboard interactions to provide a hybrid physical and virtual input/output environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
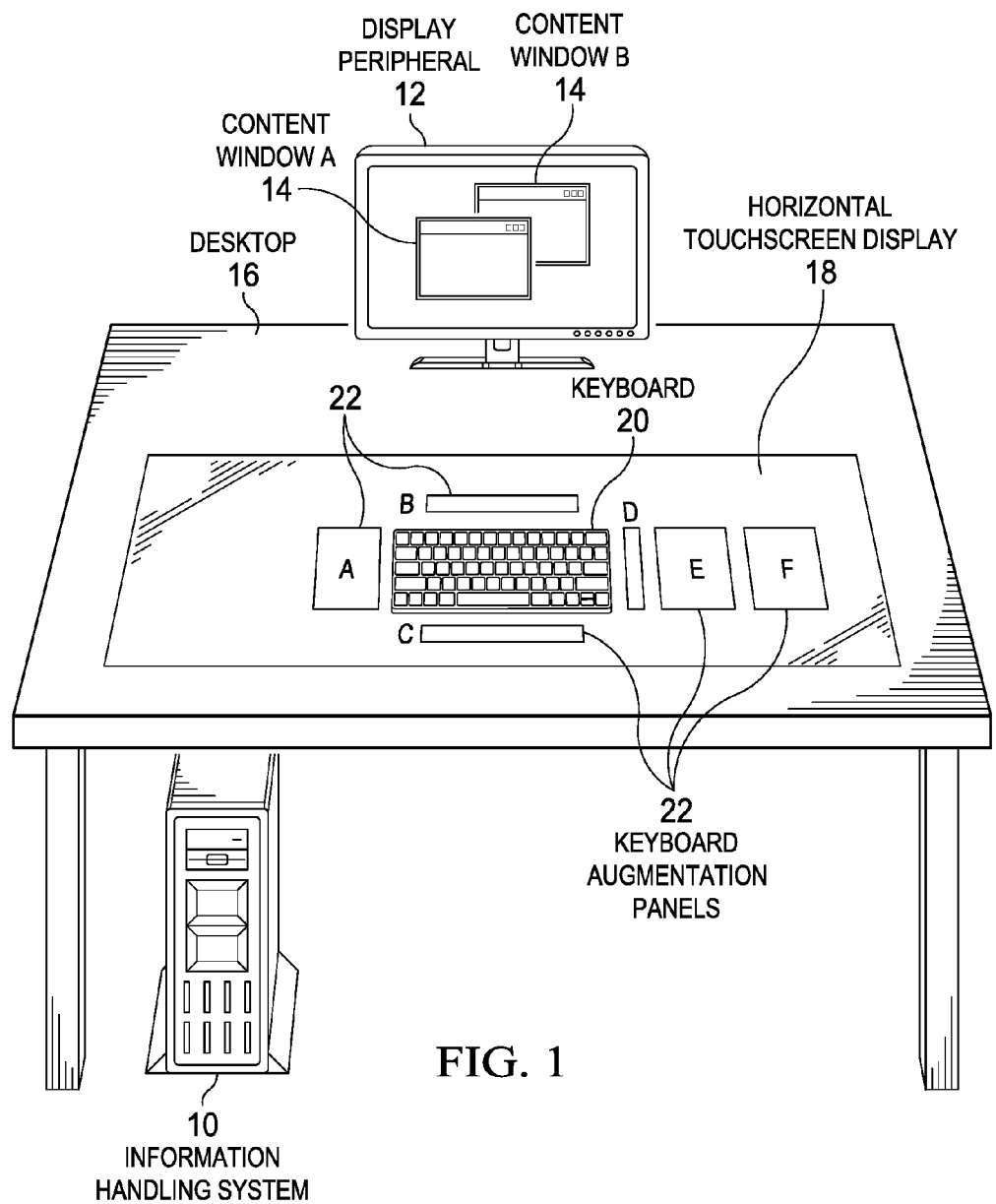
FIG. 1 depicts an information handling system interacting with physical devices placed on a horizontally-disposed touchscreen display.

Referring now to FIG. 1, an information handling system 10 is depicted interacting with physical devices placed on a horizontally-disposed touchscreen display 18. Information handling system 10 processes information with processing components, such as by running an operating system and applications, and presents the information as visual images at a display peripheral 12, such as a vertically-disposed flat panel display. In the example embodiment, information is presented as visual images in a content A window 14 provided by an active application and a content B window 14 provided by an inactive application, where the inactive application is presented in the background of the active application. An end user interacts with the active application through content A window 14 by making inputs through input devices, such as a keyboard 20, a mouse and/or other conventional physical devices. The end user may select the inactive application for accepting inputs so that content B window 14 enters the foreground to accept the inputs while content A window enters the background. Such selections are supported by various operating systems, such as Windows and Linux.

In the example embodiment, a desktop 16 provides a horizontal workspace for the end user to place physical input devices. A horizontally-disposed touchscreen display 18 is disposed on top of desktop 16 and interface with information handling system 10 to act as an input and output device. In various embodiments, horizontally-disposed touchscreen display 18 is a flat panel display with a capacitive input surface that detects end user touches, such as tablet information handling system with its own processing components. Horizontally-disposed touchscreen display 18 interfaces with information handling system 10 and peripheral display 12 through conventional wired and wireless interfaces, such as USB or IEEE 802.11 interfaces. An end user thus has the option of presenting visual information from applications in content windows 14 displayed at horizontally-disposed touchscreen display 18, or presenting various "virtual" input devices, such as keyboards or touchpads that accept end user inputs for applications presented at peripheral display 12.

Keyboard 20 is a physical keyboard device that accepts keyed inputs from an end user for use by applications running on information handling system 10. When keyboard 20 is placed on top of horizontally-disposed touchscreen display 18, logic executing across processing components of information handling system 10 and display 18 detects physical keyboard 20 and presents keyboard augmentation panels 22 proximate keyboard 20 that augment and enhance end user interactions with keyboard 20. In the example embodiment, keyboard augmentation panels 22 are depicted as individual panels A-F that are displayed proximate keyboard 20 based upon the detected position of keyboard 20. Keyboard 20 may include physical identifiers on its bottom surface that identify it as a physical keyboard or information handling system 10 may include a manual configuration that learns to identify keyboard 20 based upon its touch at display 18 or with an image captured by a camera directed towards display 18. Keyboard augmentation panels 22 are tied to the physical position of keyboard 20 so that display 18 moves keyboard augmentation panels 18 as keyboard 20 moves across display 18. In the example embodiment, keyboard augmentation panels 22 are automatically configured to augment a right-hand dominant user with content determined at each panel 22 based upon the active application selected by the end user to run on information handling system 10. For example, a camera captures images of the end user interacting with keyboard 20 to estimate the end user's hand dominance, such as by viewing the hand that performs placement of keyboard 20 or primary interaction with keyboard 20. The active application, such as the application presenting content A window 14, then generates content for panels 22 based upon anticipated end user input needs.

In one example embodiment, a word processor presents content A window 14 and receives an indication of keyboard 20 placement on display 18. In response, panel A is populated with font selections and data placed in cut-and-paste functions of the word processor. Panel B is populated with information from a word prediction algorithm that the end user may watch during typing and quickly select with a tap. Panel C is populated with a save function that the user may tap to save a document. Panel D is located directly proximate keyboard 20 to accept menu inputs with minimal end user motion. The menu inputs may drive word processor functions or select content to be presented in other keyboard augmentation panels 22. Panel E provides a touchpad that the end user may access for mouse inputs with minimal motion of his dominant hand. Panel F provides other desired content helpful but less-frequently accessed by the end user, such as a number pad. In the example embodiment, the end user may quickly interchange content between panels E and F by a press at a menu in panel D.

In an example embodiment, an end user who has a spreadsheet active as an application for content B window 14 may select content B as the active application with an input at a menu presented in panel D. In response to selection of Content B window 14 as the active application, keyboard augmentation panels 22 automatically reconfigure to provide content in panels A-F adapted to support the application of Content B window 14, such as graphical tools tailored to spreadsheet inputs. For example, a number pad is presented in Panel E while a touchpad moves to Panel F. In various embodiments, the content presented in each panel is automatically selected by the active application and/or preconfigured based upon end user preferences. In one example embodiment, keyboard augmentation panels may be selectively and individually undocked from a position tied to keyboard 20 for increased end user flexibility.

Figure 2:
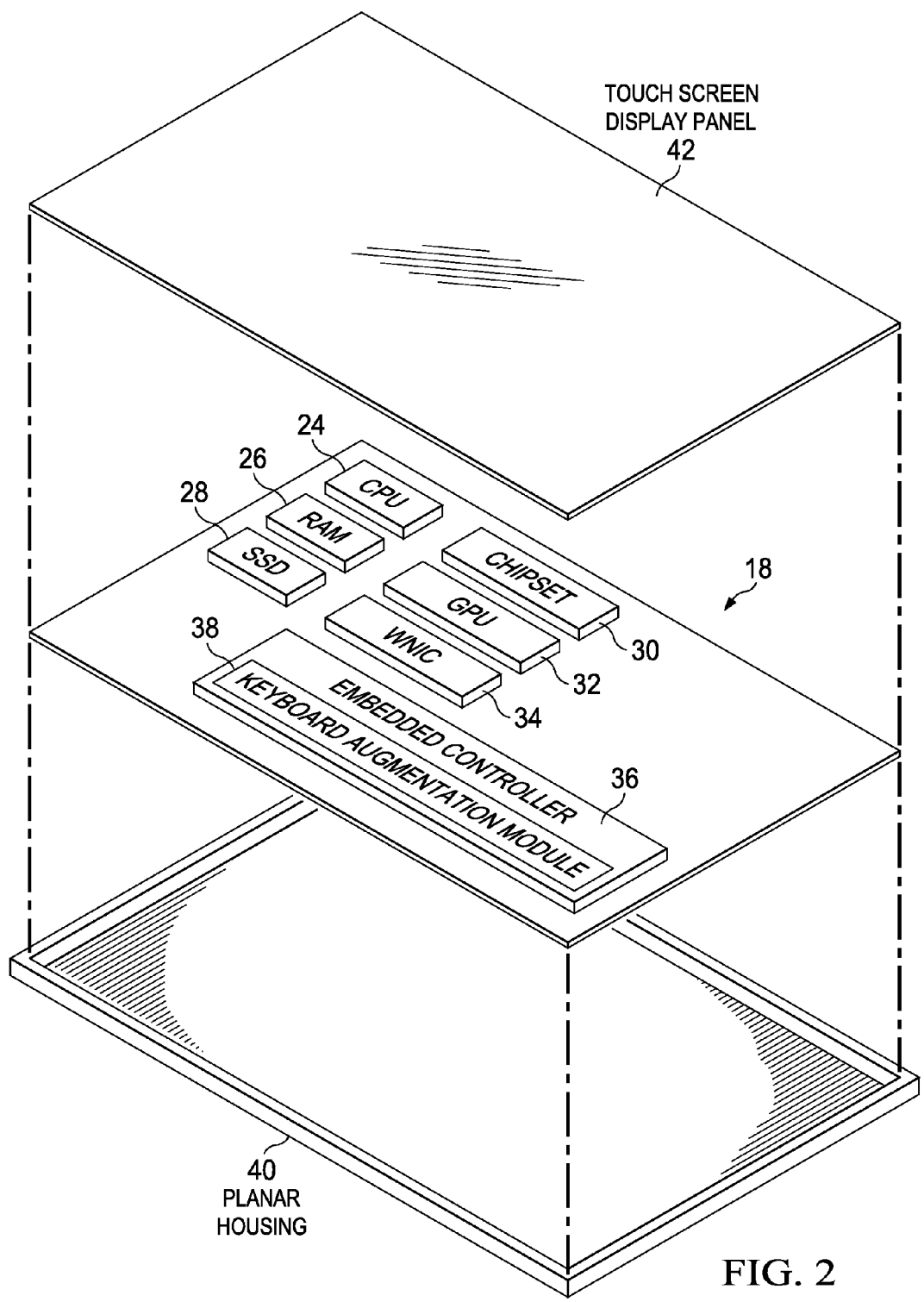
FIG. 2 depicts an example embodiment of a horizontally-disposed touchscreen display that supports interaction with physical devices.

Referring now to FIG. 2, an example embodiment depicts a horizontally-disposed touchscreen display 18 that supports interaction with physical devices. In the example embodiment, horizontally-disposed touchscreen display 18 has a tablet information handling system form factor that runs applications for presenting content both on the horizontal display surface and the vertical display peripheral. For example, a central processing unit (CPU) 24, random access memory (RAM) 26 and solid state drive (SSD) 28 interface through a motherboard structure to execute application instructions and store information. A chipset 30 includes processing components and firmware modules that coordinate information input and output. For example, chipset 30 coordinates generation of visual information by a graphical processing unit (GPU) 32 based upon inputs detected by an embedded controller 36, also known as a keyboard controller. A wireless network interface card (WNIC) 34 processes wireless communications, such as WiFi and Bluetooth communications. The processing components are supported in a planar housing 40 and captured under a touchscreen display panel 42 that is interfaced with embedded controller 36 to manage touch inputs.

In the example embodiment, a keyboard augmentation module 38 is depicted as a firmware module executing on embedded controller 36, such as part of a Basic Input/Output System (BIOS). Keyboard augmentation module 38 detects keyboard 20 and manages presentation of keyboard augmentation modules based upon the location of keyboard 20 and other factors, such as inputs received from an active application running on CPU 24. In various embodiments, operational elements of keyboard augmentation module 38 are distributed as firmware and software instructions across various processing components to enable management of content in keyboard augmentation panels as described herein. For example, operating system driver files interact with display panel 42 through BIOS instructions of keyboard augmentation module 38 executing on embedded controller 36 and GPU 32. Although the example embodiment depicts horizontally-disposed touchscreen display 18 as a tablet information handling system form factor, in other embodiments a separate information handling system will support keyboard augmentation module 38 to manage presentation of keyboard augmentation panels 22 at a "dumb" display panel.

Figure 3:
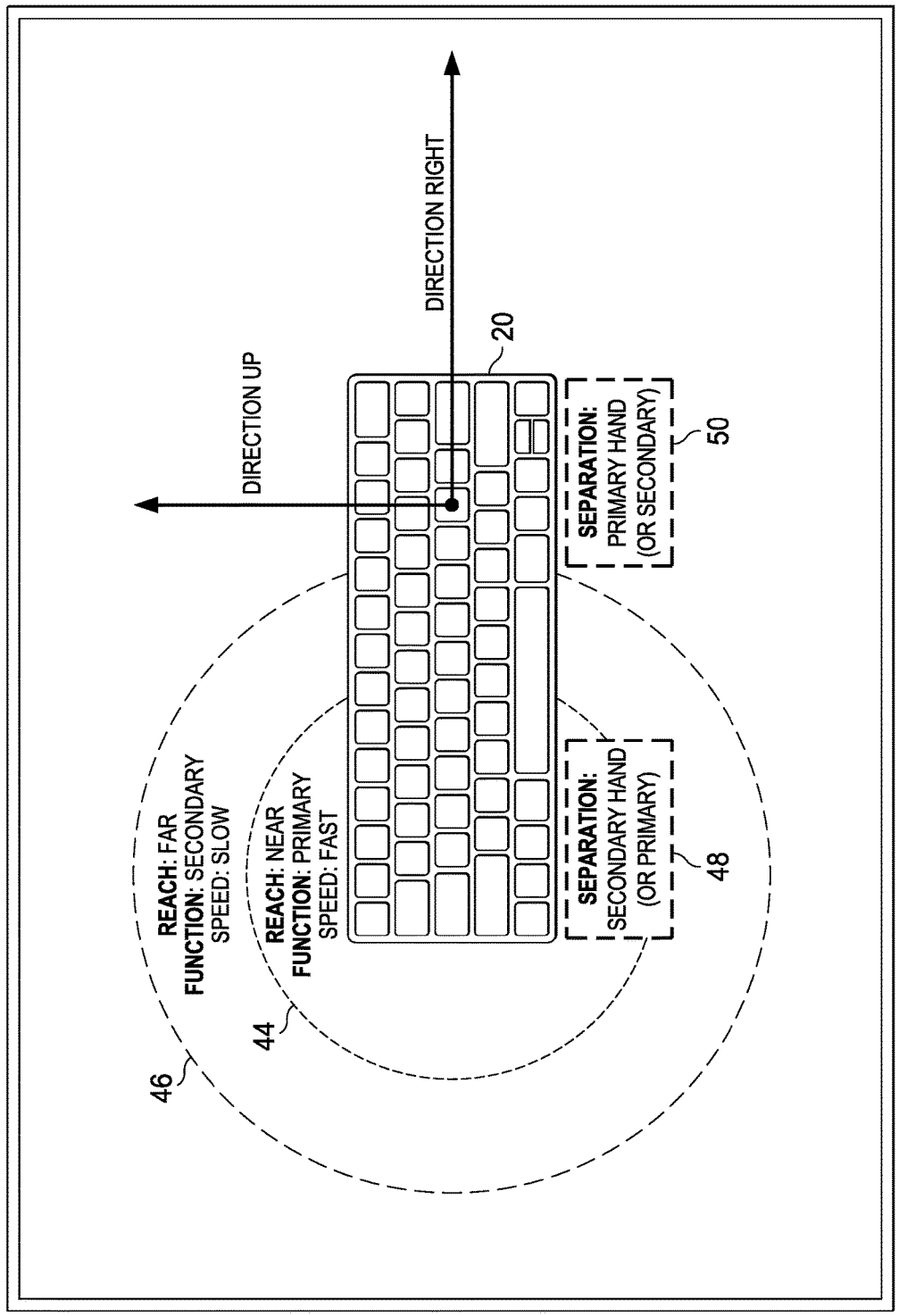
FIG. 3 depicts an example embodiment of spatial interfaces zones defined relative to a physical keyboard placed on a horizontally-disposed touchscreen display.

Referring now to FIG. 3, an example embodiment depicts spatial interface zones defined relative to a physical keyboard 20 placed on a horizontally-disposed touchscreen display. The interface layout proximate keyboard 20 is spatially tailored by characteristics that provide meaning and context to an end user interacting with keyboard augmentation panels 22. Reach of an end user is defined ergonomically to lead to a natural and rapid distinction between near, primary and quick interfaces as opposed to far, secondary and slow interfaces. A separation is involved with the usage of two hands to make inputs at keyboard augmentation panels with a focus on a primary and secondary hand that depends on the end user's hand dominance. As hands transition between keyboard and graphical interfaces, direction is used to provide aim and a relationship between inputs and outputs. In the example embodiment, a near reach zone 44 is defined with a center point located near the typing position of the user's left hand and approximating the reach of the user based upon movements of the wrist while the user's arm is substantially still. The near reach zone provides near interfaces with primary functions and fast speed so that keyboard augmentation panels in reach zone 44 are tailored towards inputs that an end user will typically use more often for quick touches. Near reach zone 44 has a circumference that passes approximately through the center of keyboard 20. A far reach zone 46 is defined from the outer circumference of near reach zone 44 to a distance associated with some arm movement of an end user. The far reach zone provides far interfaces for secondary functions with an associated less-frequent usage and/or slower input function relationship. As is depicted by separation zone 48 and 50, palm location for the secondary or primary hand is defined below keyboard 20 in each zone as the launch position for end user inputs, thus leading to more efficient end user motions.

Figure 4:
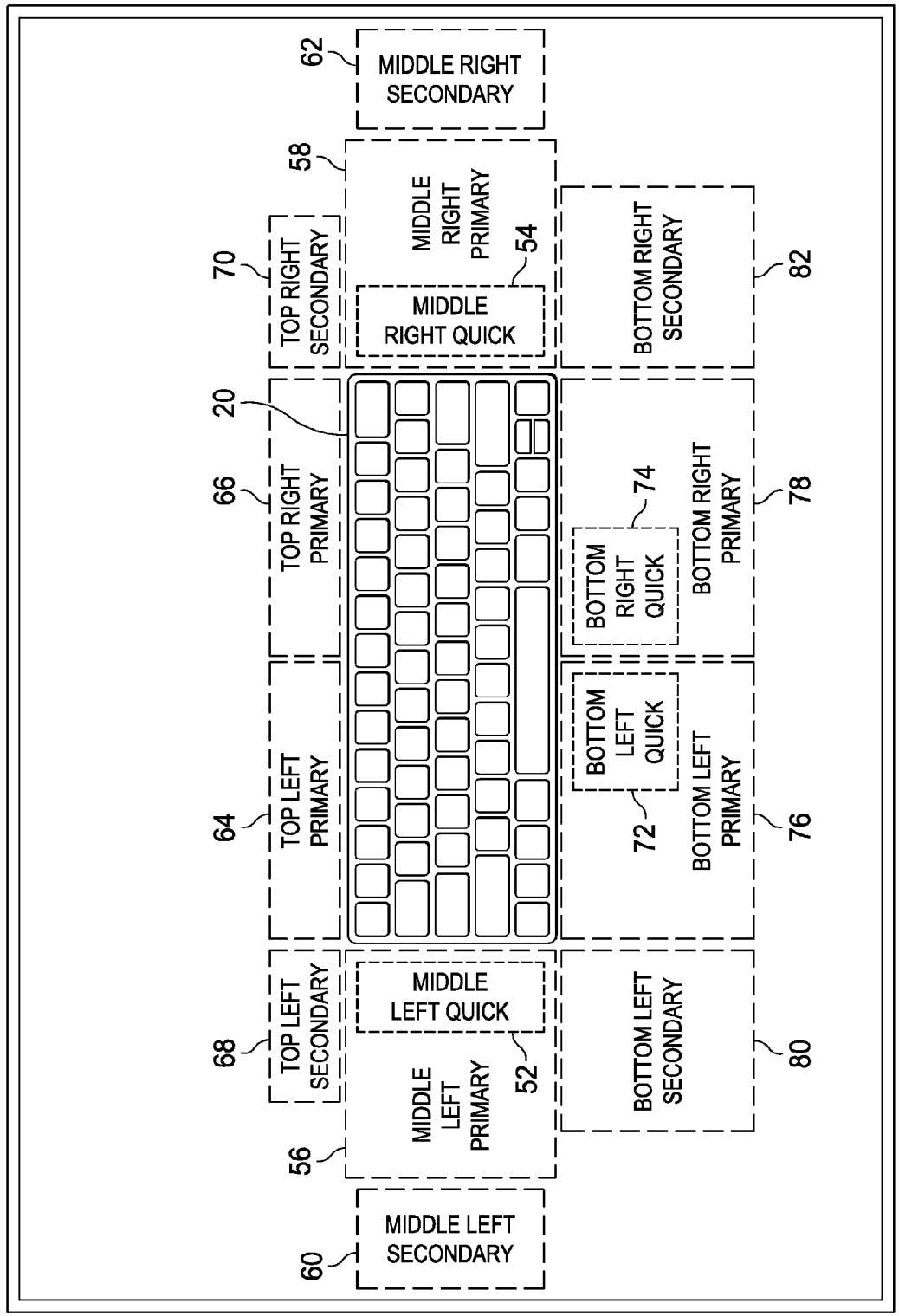
FIG. 4 depicts an example embodiment of keyboard augmentation panels presented relative to a keyboard placed on a horizontally-disposed touchscreen display.

Referring now to FIG. 4, an example embodiment depicts keyboard augmentation panels 22 presented relative to a keyboard 20 placed on a horizontally-disposed touchscreen display 18. In various embodiments, some or all of the panels are presented based on a number of factors, such as keyboard location, keyboard orientation, active application, end user preferences and active application predefined settings. Middle left 52 and right 54 quick panels provide menu options that end users tend to use on a more frequent basis at a close-in location that takes minimal finger or hand movement for an end user to actuate. As an example, panels 52 and 54 provide menus that define the content provided at other panels. For instance, selection of a menu item in panel 54 changes content presented between middle right panels 58 and 62 or between middle left panels 56 and 60. Alternatively, a selection at a menu of panel 52 or 54 provides a selection between plural different contents presented at panel 56 and 58, such as presentation of available fonts for a word processor and available cut and paste data so that a user can readily see what the user can cut and paste at a document. To provide an uncluttered interface view, panels 52 and 54 may also include a menu option that selectively opens and collapse other keyboard augmentation panels as the panels are needed or not by an end user.

The hierarchy and spatial nature of panels 52-82 provide a solid foundation for introducing functionalities that adapt to an end user environment and usage mode. In the panel guideline provided by FIG. 4 middle panels 52-62 align for finger and wrist inputs related to active functions of an application user interface. Top panels 64-70 align with information functions of an application user interface that have less common physical interactions, such as word suggestion or auto correction information. Bottom panels 72-82 align with control functions entered by palm or thumb inputs. In various embodiments, panels 52-82 may selectively populate based upon the user environment so that application designers and, in turn, end users have freedom to place and customize keyboard augmentation panels 22 in a manner that promotes efficient end user interactions. In one example embodiment, keyboard augmentation module 38 learns end user interaction patterns to predict panel content and location that will promote efficient end user interactions.

Figure 5:
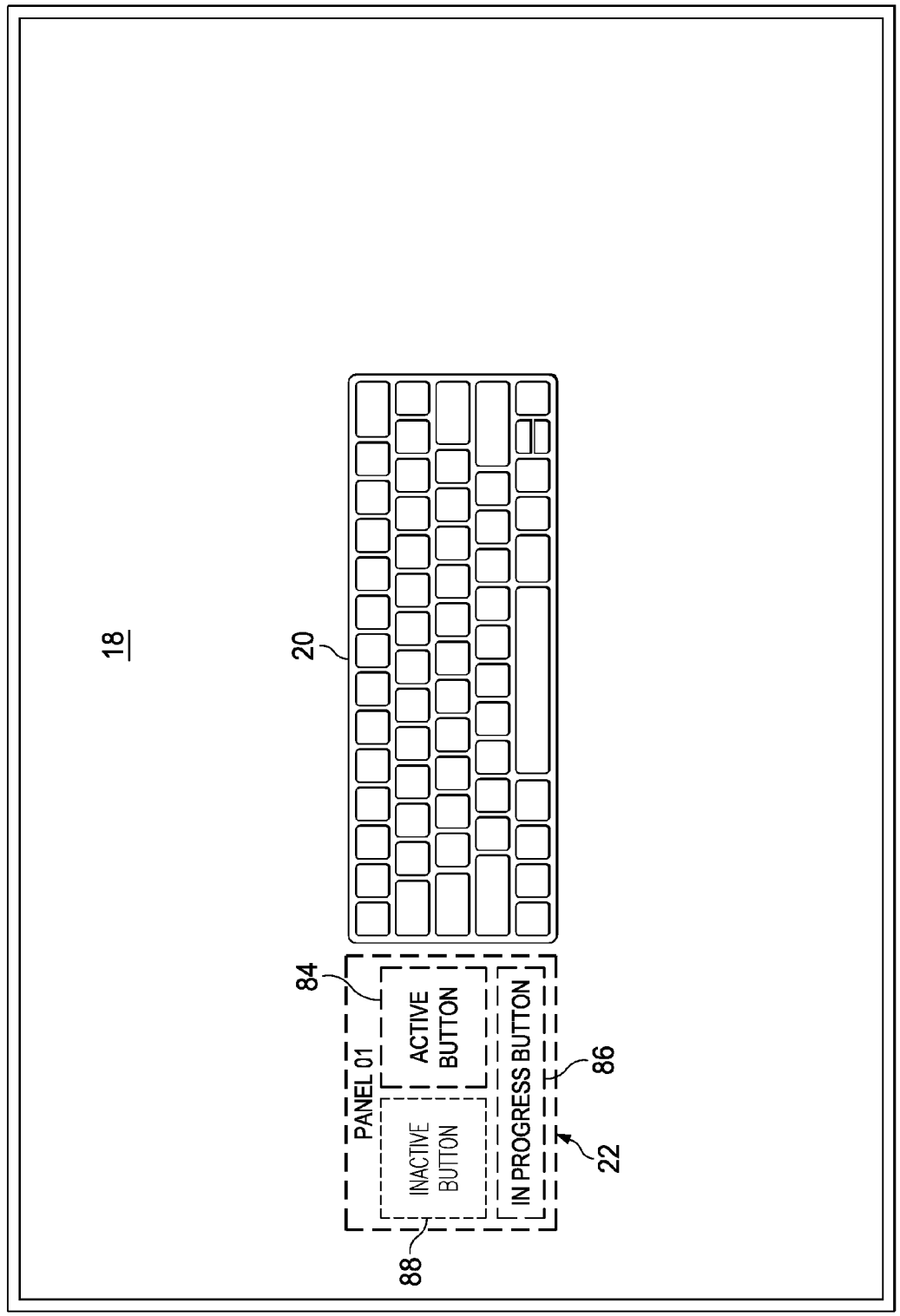
FIG. 5 depicts an example embodiment of keyboard augmentation panels presented with adaptive activity states.

Referring now to FIG. 5, an example embodiment depicts keyboard augmentation panels 22 presented with adaptive activity states. Panels 22 are managed with three states that adopt to end user interactions. In an active state, depicted by example active panel 84, a panel interface button has an increased presence, such as in color, tone, contrast and/or brightness, so that an end user may more readily identify the area at a glance as having a ready and available influence towards working ongoing through the keyboard interface. An in progress state, depicted by example in progress panel 84, provides a more enhanced appearance to show that work related to the interface is ongoing, such as with dynamic effects or animations that emphasize the ongoing activity. An inactive state, depicted by example inactive button 88, provides a subdued appearance to avoid distracting an end user with functions and options that do not correlate to the user environment. As an end user interacts with an application, selection of a panel or an option/button in a panel impacts the presentation state of related functions so that the end user is naturally led through a progression of related functions without having search excessively for interfaces of interest.

Figure 6:
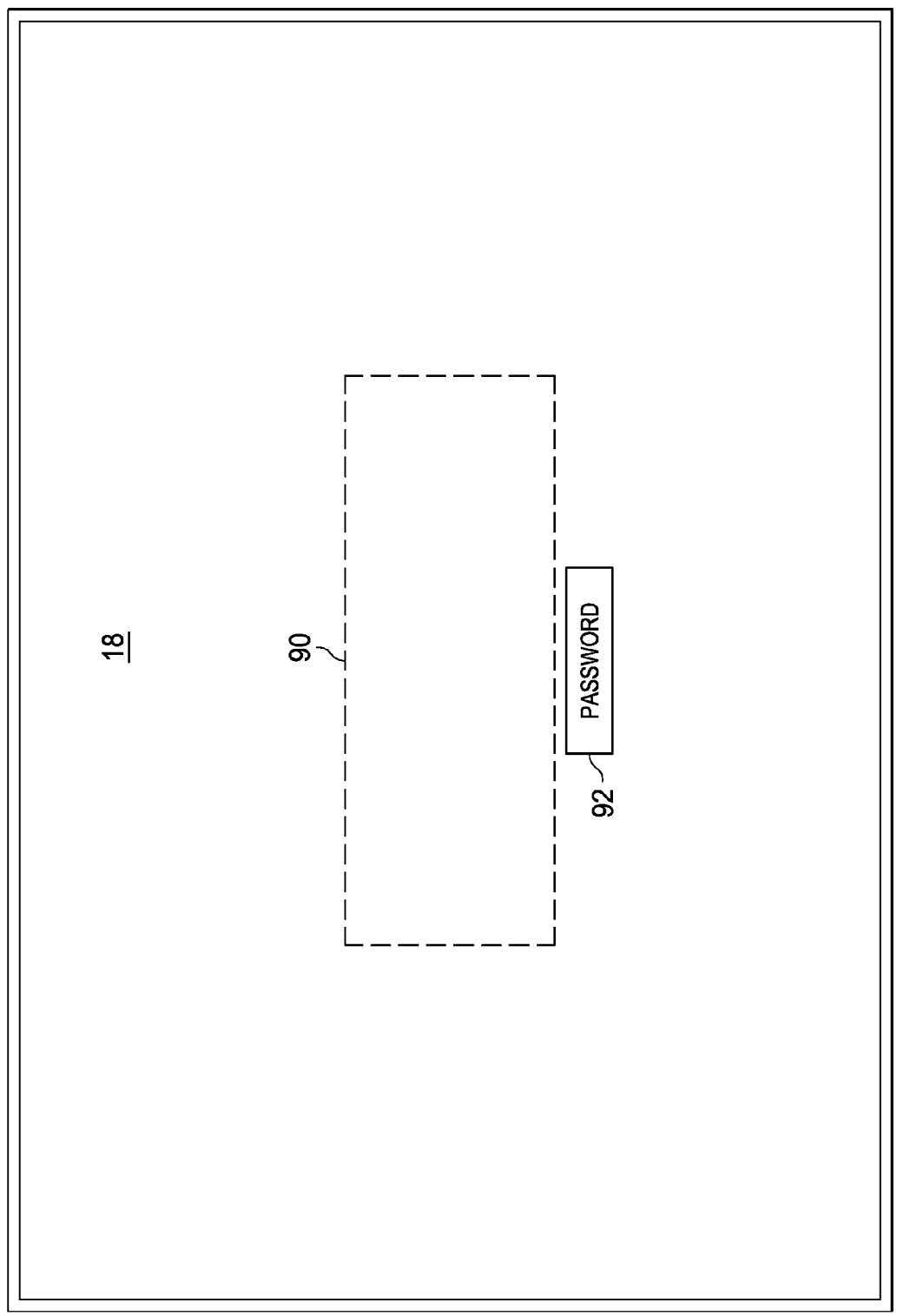
FIG. 6 depicts an example of a horizontally-disposed touchscreen display configured to accept a physical keyboard.

Referring now to FIG. 6, an example embodiment depicts a horizontally-disposed touchscreen display 18 configured to accept a physical keyboard 20. In the example embodiment, a keyboard placement area 90 is presented at the display as an indication to an end user and a password entry box 92 is presented below placement area 90 to accept input of a password by the end user after placement of the keyboard. In one example embodiment, keyboard 20 interacts with an information handling system through a wireless interface, such as Bluetooth. As an information handling system detects presence of a keyboard's Bluetooth signal, the information handling system automatically generates boxes 90 and 92. In one embodiment, the Bluetooth signal provides a security codes that authorizes access upon contact of the keyboard with the display 18 surface. Alternatively, the Bluetooth signal identifies the user to load the user's configuration and user name in preparation of accepting a password typed into box 92. Thus, the keyboard provides a security token applied by the information handling system to control access to processing capabilities and information.

Figure 7:
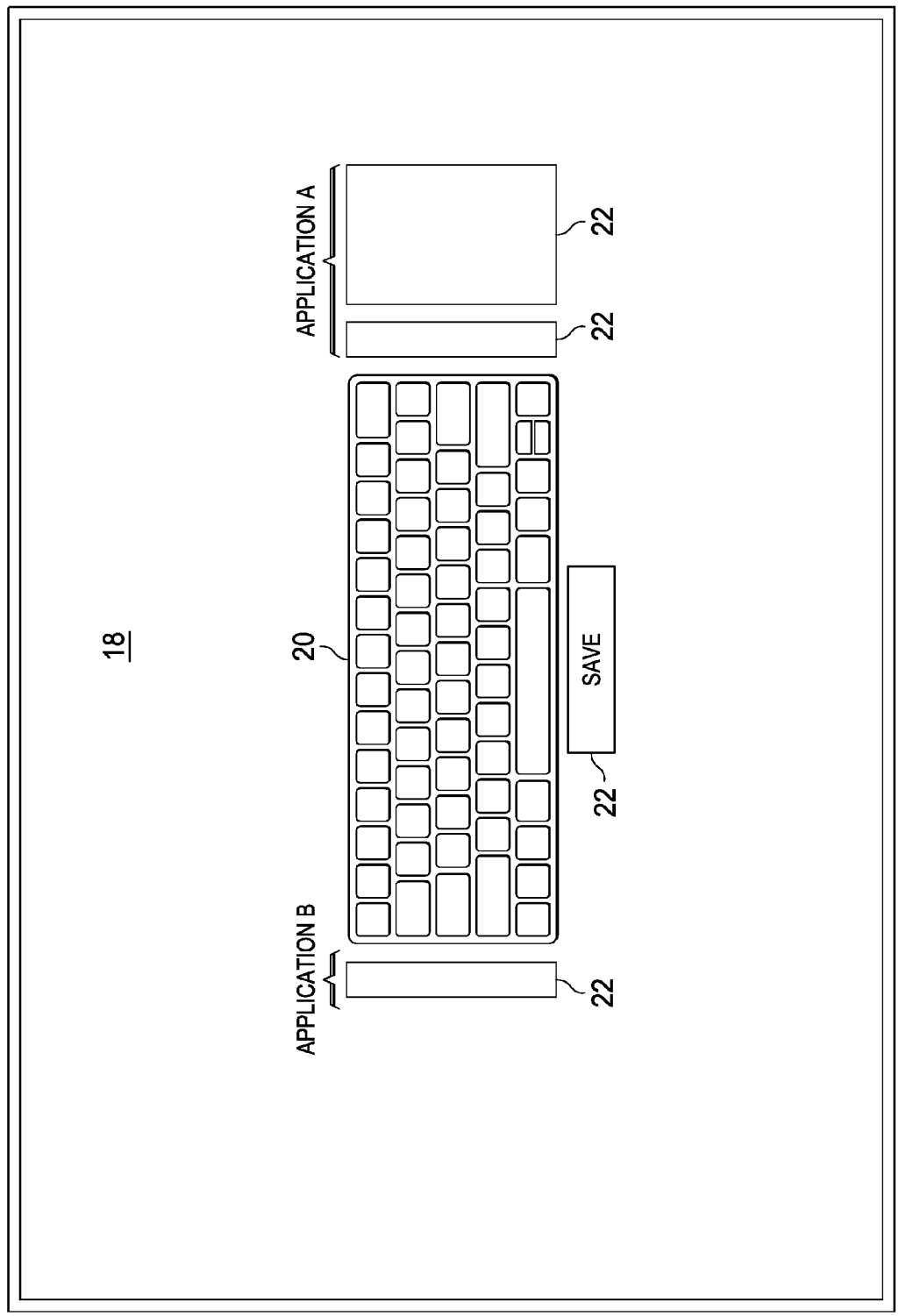
FIG. 7 depicts an example embodiment of an adaptive keyboard augmentation panel responding to selection of an active application at the information handling system.

Referring now to FIG. 7, an example embodiment depicts an adaptive keyboard augmentation panel 22 responding to selection of an active application at the information handling system. In the example embodiment, upon placement of keyboard 20 on top of display 18 and selection of an active application, panels 22 associated with the active application are presented on the right side of keyboard 20 for a right hand dominant end user. A compressed panel 22 is presented on the user's left hand or non-dominate side of keyboard 20. Panels that are common to both the applications, such as a "save" panel, are presented in the center top and bottom positions relative to keyboard 20. As an end user changes the active application, panels 22 change their relative positions to adapt to the end user's usage mode. For example, if the user changes the active application from A to B, panels 22 associated with application B take the place of panels associated with application on the dominant side of keyboard 20, while panels associated with application A go to an inactive state on the non-dominate side of keyboard 20.

Figure 8:
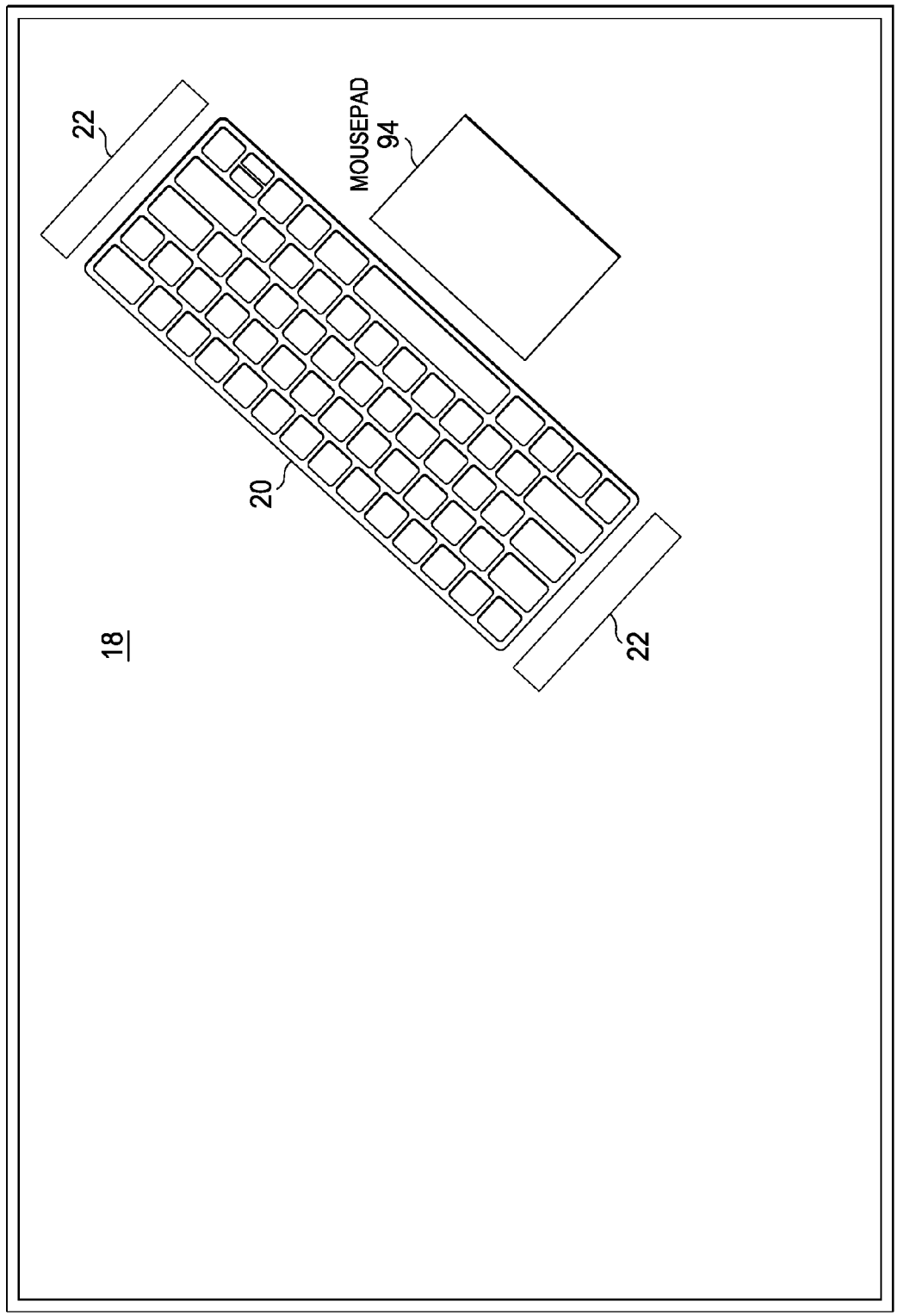
FIG. 8 depicts an example embodiment of an adaptive keyboard augmentation panel responding to placement of a physical keyboard in a location associated with non-keyboard inputs.

Referring now to FIG. 8, an example embodiment depicts an adaptive keyboard augmentation panel 22 responding to placement of a physical keyboard 20 in a location associated with non-keyboard inputs. In the example embodiment, as keyboard 20 is moved to a location on the side of display 18, panels 22 collapse to an inactive state with a minimal footprint that decreases clutter on display 18. Similarly, mousepad 94 transitions from a middle location to a bottom location more readily accessible by the end user. As an example, movement of keyboard 20 indicates an intention by an end user to perform task that are not associated with typed inputs, such as web browsing, drawing or handwriting on a digital writing pad. Although the example embodiment illustrates how keyboard augmentation panels 22 stay docked to keyboard 20 as keyboard 20 moves to different positions, in one alternative embodiment, keyboard augmentation panels 22 may reside at an idle position on the edge of display 18 until activated by an end user or movement of keyboard 20 to a typing position.

Figure 9:
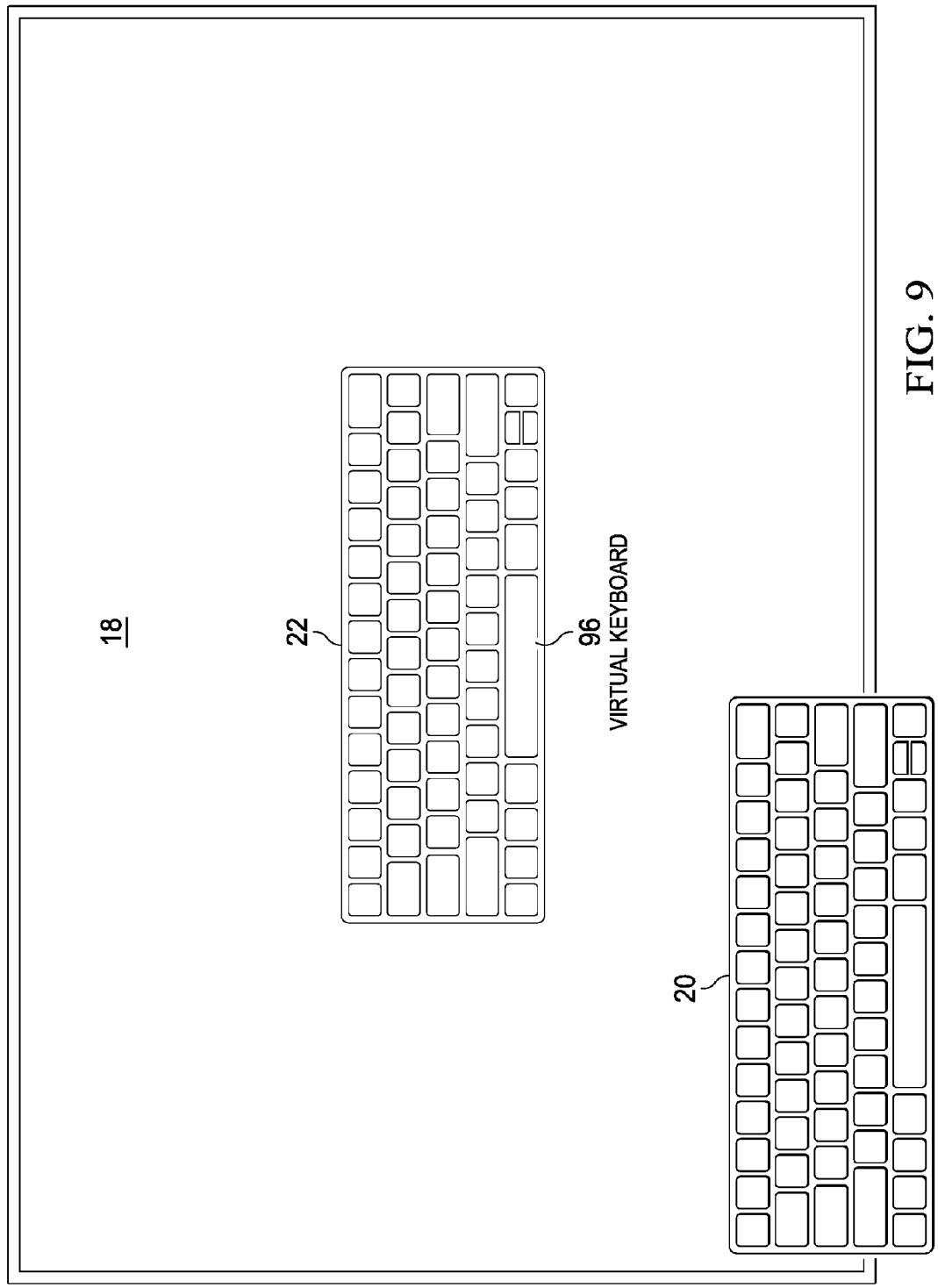
FIG. 9 depicts an example embodiment of an adaptive keyboard augmentation panel responding to removal of a physical keyboard from a horizontally disposed touchscreen display.

Referring now to FIG. 9, an example embodiment depicts an adaptive keyboard augmentation panel 22 responding to removal of a physical keyboard from a horizontally disposed touchscreen display 18. Once keyboard 20 is removed a variety of automated or user-configured keyboard augmentation panel presentations may be provided. In the example embodiment, a virtual keyboard 96 is presented in the place of physical keyboard 20. Presentation of virtual keyboard 96 may be a preferred configuration where an end user continues to have an active application associated with typed inputs, such as a word processor, email application, etc . . . . In other situations, such as where a multimedia application is active, virtual keyboard 96 may instead minimize to a small size between other panels 22 so that the end user may use keyboard augmentation panels 22 of interest while having an uncluttered display presentation. In such a presentation, the end user may quickly activate virtual keyboard 96 with a selection at the middle panel 22. In yet other situations, keyboard related functions may have a lower preference relative to an open and uncluttered display area 18, such as if the user is performing writing or drawing at the display 18 surface. In such a situation, all of the keyboard augmentation panels 22 may either be removed from display 18 or minimized to a side location out of the end user's way.

Figure 10:
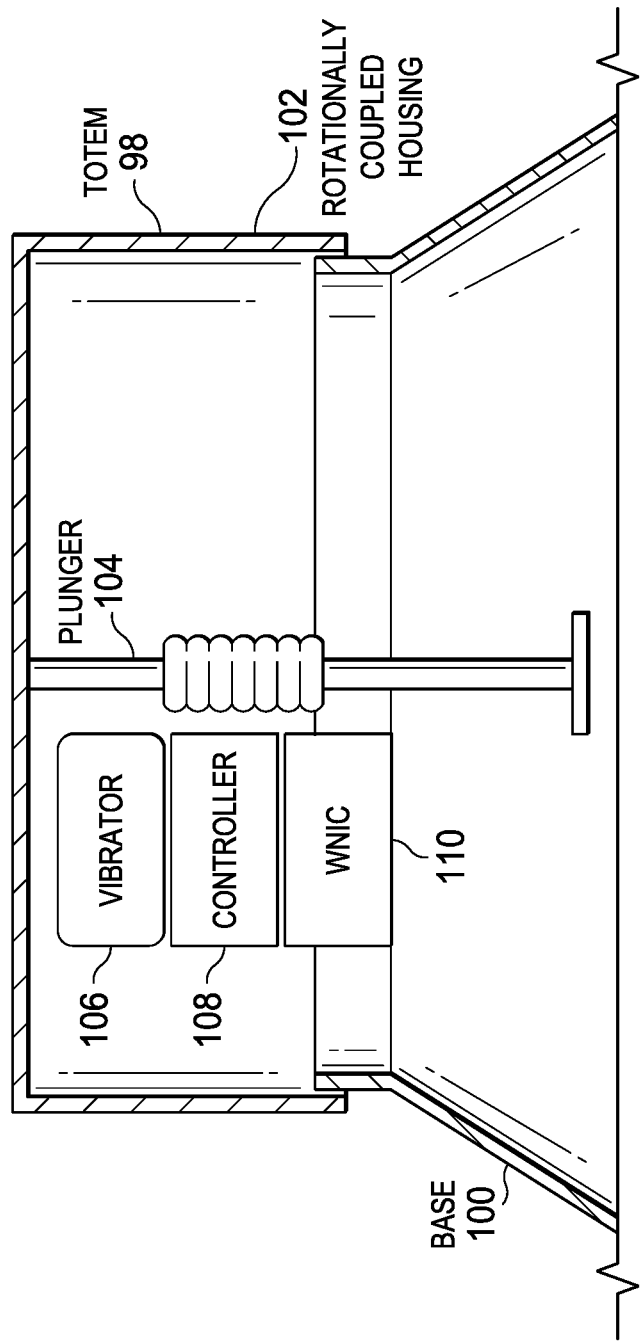
FIG. 10 depicts a side cutaway view of a physical totem device placed on a horizontally-disposed touchscreen display.

Referring now to FIG. 10, a side cutaway view depicts a physical totem device 98 placed on a horizontally-disposed touchscreen display 18. Totem device 98 is an example of another physical device similar to the keyboard that has augmentation panels presented at touchscreen display to provide a hybrid physical and virtual user interface. In the example embodiment, totem 98 has a base 100 detected by display 18 that supports a rotationally coupled upper housing 102. A spring-biased plunger 104 provides vertical movement of housing 102 that produces a tap input on display 18 along with a rotational orientation. A vibrator 106 provides haptic feedback to a user that an input has been made, such as when the input is acknowledged from an information handling system through a wireless network interface card (WNIC) 110 and controller 108. Alternatively, totem 98 may act as a "dumb" device that translates end user inputs through physical inputs at display 18 that are otherwise confirmed by the information handling system and/or display presentation. An end user performs inputs by placing totem 98 on touchscreen display 18 and rotating or pressing rotationally coupled housing 102.

Hybrid input/output devices that include a physical device and displayed augmentation panels work to enhance end user efficiency by promotion two-handed interactions by end users. End user's tend to focus on a dominant hand when performing interactions with a user interface and physical device. Supporting a hybrid input device with augmentation panels presented at a dominant hand position while the physical device remains in a non-dominant hand position allows an end user to remain focused with on a task at the dominant hand while utilizing the non-dominant hand to manage the task. Totem 98 provides on example of such a tool where a right hand dominant user interacts with augmentation panels using a left hand input to perform menu selections related to right hand actions. For example, rotating and pushing on totem 98 with a left hand manipulates menu options for drawing with a stylus using a right hand so that color, hue, brightness and other adjustments are performed with the user's focus on the drawing instead of a complex menu structure. As another example, totem 98 provides an input device to adjust active augmentation panels supporting keyboard operations. For example, totem inputs adjust mousepad and number pad presentations during interactions with a spreadsheet to allow an end user to effortlessly transition between character and number inputs. In one embodiment, the menu manipulated by totem 98 is determined based upon the type and location of physical devices disposed on the display 18. For example, if a keyboard 20 is located in a typing position, the keyboard augmentation module manipulates presentation of keyboard augmentation panels 22; however, if the keyboard 20 is placed to a side of display 18 in a non-typing position, the keyboard augmentation module transitions to present a totem menu 112 that is manipulated by totem 98 inputs instead of the keyboard augmentation panels.

Figure 11:
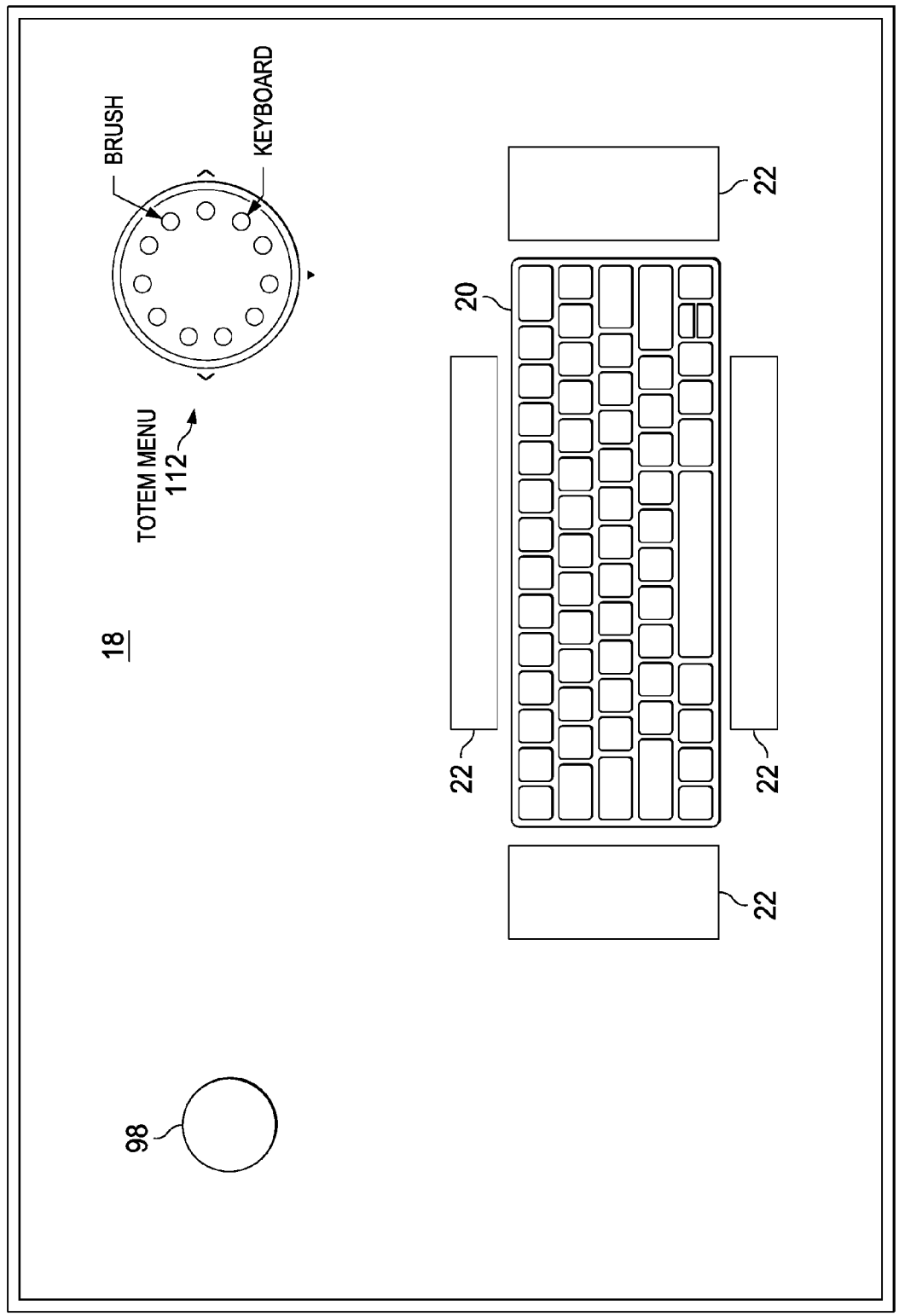
FIG. 11 depicts an example embodiment of a physical totem device managing a menu presented at a distal location of a horizontally-disposed touchscreen display.

Referring now to FIG. 11, an example embodiment depicts a physical totem device 18 managing a menu presented at a distal location of a horizontally-disposed touchscreen display 18. When horizontally-disposed touchscreen display 18 detects totem 98, a totem menu 112 is presented in a distal location that reflects manual inputs made at totem 98. In one embodiment, the location of menu 112 is automatically selected to present on the dominant hand side of display 18 for the end user. Alternatively, totem menu 112 may present at positions previously selected by an end user or preconfigured by an application running on the information handling system. In the example embodiment, totem menu 112 presents selections of physical devices that the end user may choose to interact with. For example, with selection of keyboard at totem menu 112, manipulation of totem 98 adjusts the content presented by keyboard augmentation panels 22. As the end user interacts with keyboard 20, the user may adapt content in panels 22 with a turn of totem 98. Feedback from selections made at totem 98 is provided with haptic vibrations and sounds, and also presented at totem menu 112 in a location readily view by a right hand dominant user. The end user has enhanced efficiency at interacting with keyboard 20 by encouraging use of the non-dominant hand.

Figure 12:
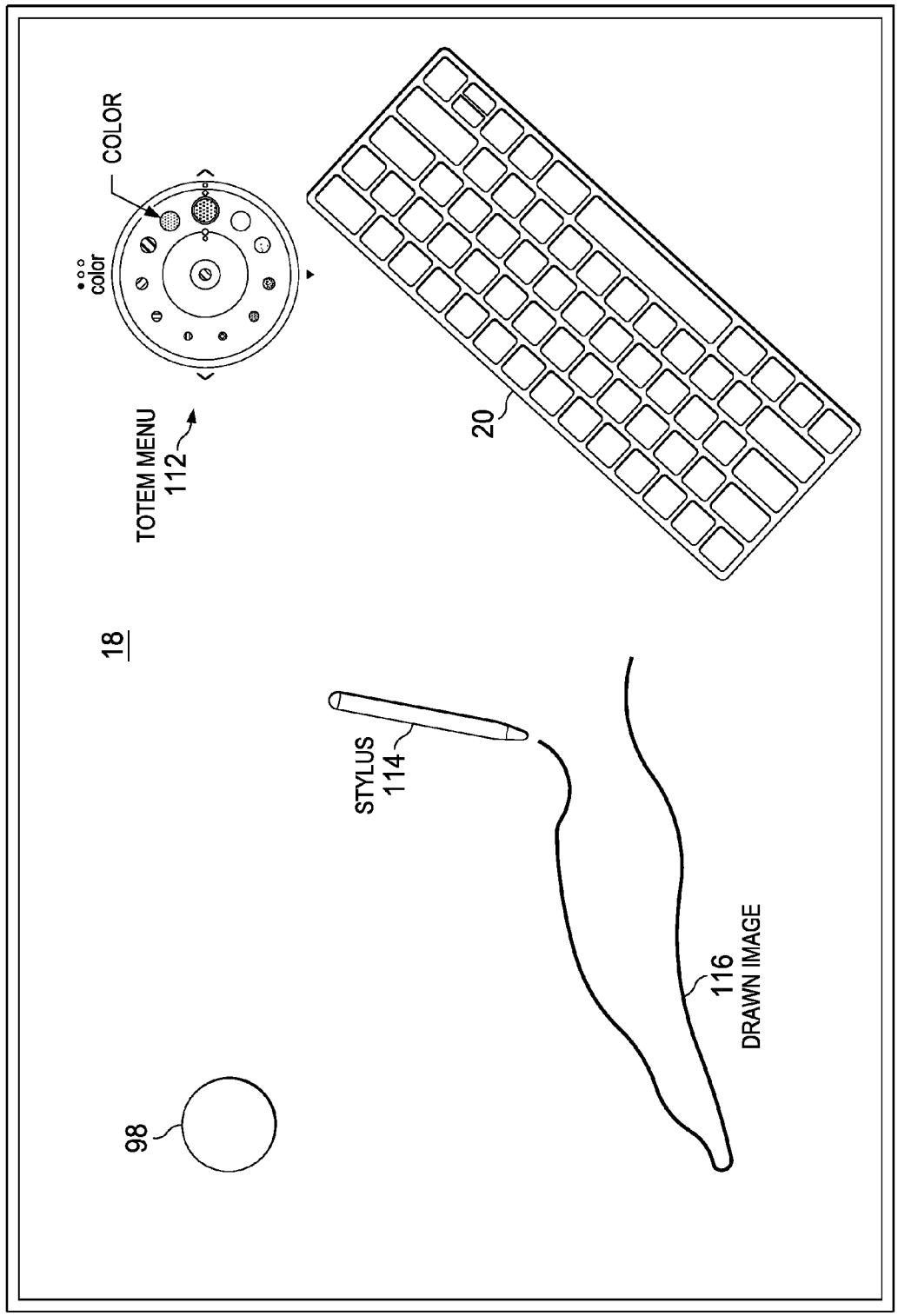
FIG. 12 depicts an example embodiment of a physical totem managing a menu for a physical stylus during inputs at a horizontally-disposed touchscreen display.

Referring now to FIG. 12, an example embodiment depicts a physical totem 98 managing a menu for a physical stylus 114 during inputs at a horizontally-disposed touchscreen display 18. In the example embodiment, the end user has selected to make inputs for stylus 114 through totem 98. As the end user writes or draws with stylus 114 on display 18, turns and presses at totem 98 adapt the stylus inputs to the options presented at menu 112. For example, a press of totem 98 while a "color" option is highlighted at menu 112 adjusts menu 112 to select color for the stylus 114 drawn image 116. A particular color is selected as stylus 114 draws image 116 on display 18 by turning totem 98 so that the selected color is presented at menu 112. The end user may perform similar adjustments to the drawing with non-dominant hand inputs at totem 98 by selecting other inputs, such as stylus 114 as the physical device controlled by totem 98 inputs. For example, inputs at totem 98 may change stylus 114 inputs by changing the thickness, brush characteristics, etc . . . . In one alternative embodiment, the menu 112 content automatically adjust to a stylus 114 input when the position of keyboard 20 is detected by display 18 as located at a side of the display 18 surface, thus indicating an intention to make non-keyboard inputs. To encourage end user association of the totem 98 and menu 112, menu 112 is presented with a shape that emulates totem 98, such as a round shape having the same or substantially the same circumference as totem 98.

Figure 13:
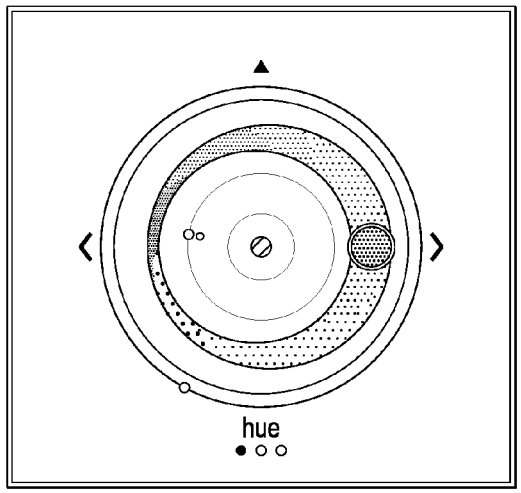
FIG. 13 depicts an example embodiment of a physical totem sub-menu management for color hue.
Figure 14:
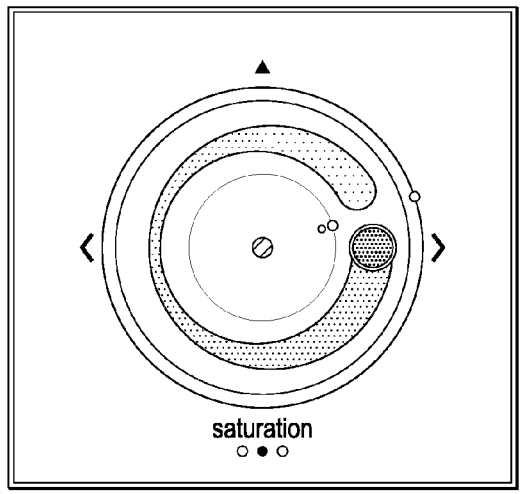
FIG. 14 depicts an example embodiment of a physical totem sub-menu management for color saturation.
Figure 15:
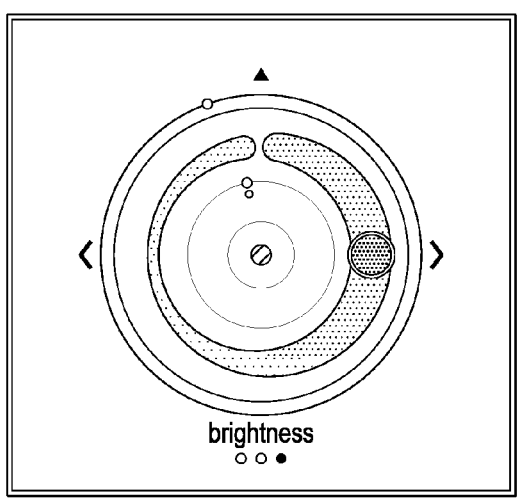
FIG. 15 depicts an example embodiment of a physical totem sub-menu management for brightness management.

Referring now to FIGS. 13, 14 and 15, example embodiments depict a physical totem 98 sub-menu management for color hue, color saturation and brightness management. An end user selects a sub-menu by clicking sideway on totem 98 menu 112 depicted at FIG. 12 so that color options are provided. The color options are presented with hue, saturation and brightness options available with another sideway click at totem 98. In FIG. 13, the end user has selected a hue option so that turning totem 98 presents the available hues at menu 112 with turning of totem 98 selecting a hue. In FIG. 14, the end user has selected a saturation option so that turning totem 98 presents the available saturations at menu 112 with turning of totem 98 selecting a saturation. In FIG. 15, the end user has selected a brightness option so that turning totem 98 presents available brightness at menu 112 with turning of totem 98 selecting a brightness. In this manner the end user focuses on the dominant hand inputs and options while adjusting the selected values with a non-dominant hand.

Although the present invention has been described in detail, it should be understood that various changes, substitutions and alterations can be made hereto without departing from the spirit and scope of the invention as defined by the appended claims.

What is claimed is:

1. An information handling system comprising:
   a processor disposed operable to execute instructions to process information;
   a memory interfaced with the processor, the memory operable to store the information;
   a graphics system interfaced with the processor and memory, the graphics system having a processor to process the information to generate pixel values for presentation of the information as visual images at a display;
   a display interfaced with the graphics system processor and memory, the display operable to present the information as visual images, the display having a touchscreen operable to detect touch inputs;
   a keyboard having mechanical keys operable to accept end user inputs and to communicate the end user inputs to the processor; and
   a keyboard augmentation module interfaced with the display, the keyboard augmentation module including a controller and embedded code stored in non-transitory memory detecting placement of the keyboard on the display and, in response to detecting the keyboard, presenting one or more keyboard augmentation panels on the display in a predetermined position relative to the keyboard;
   wherein the keyboard includes a unique identifier stored in memory, the unique identifier associated with a predetermined end user; and
   the keyboard augmentation module, in response to detecting the keyboard placement on the display, retrieves the unique identifier from the keyboard and applies the unique identifier as a password to authorize access for the predetermined end user to the information handling system.

2. The information handling system of claim 1 further comprising a planar housing having the processor, memory, graphics system and display disposed in a tablet configuration.

3. The information handling system of claim 1 wherein the keyboard augmentation module is further operable to detect movement of the keyboard at the display and, in response to detecting movement of the keyboard, to move the presentation of the augmentation panels to maintain the predetermined position relative to the keyboard.

4. The information handling system of claim 3 wherein the keyboard augmentation module is further operable to detect movement of the keyboard to one or more predetermined locations of the display, the predetermined locations associated with non-keyboard inputs, and in response to detecting movement of the keyboard to the one or more predetermined locations, to collapse presentation of the augmentation panels to a minimum state.

5. The information handling system of claim 1 wherein the keyboard augmentation panels comprise plural panels spatially located relative to the keyboard based at least upon distance, the augmentation module selectively populating first and second augmentation panels with first and second content based upon one or more predetermined factors.

6. The information handling system of claim 5 wherein the one or more predetermined factors comprise an active application running on the processor.

7. The information handling system of claim 5 wherein the one or more predetermined factors comprise a relative position of the keyboard on display.

8. A method for inputting information to an information handling system interfaced with a touchscreen display, the method comprising:
   detecting with the information handling system a wireless signal of a keyboard;
   in response to detecting, presenting at the touchscreen display a keyboard placement area and a password entry box;
   placing the keyboard on the touchscreen display at the keyboard placement area;

detecting the keyboard with the information handling system communicating through the touchscreen display;

in response to detecting, retrieving from the keyboard to the information handling system a password to authorize access to the information handling system; and presenting content in one or more keyboard augmentation panels at the touchscreen display proximate the keyboard, the content comprising touch input user interfaces supporting keyboard interactions with an application running on the information handling system.

9. The method of claim 8 further comprising:

detecting movement of the keyboard on the touchscreen display; and in response to the detecting movement, automatically moving the augmentation panels to maintain a constant position relative to the keyboard.

10. The method of claim 9 further comprising:

detecting movement of the keyboard to a predetermined position of the touchscreen display, the predetermined position associated with non-keyboard inputs; and in response to the detecting movement to the predetermined position associated with non-keyboard inputs, compressing the augmentation panels to a minimized appearance.

11. The method of claim 10 wherein the application comprises a multimedia application and the content comprises multimedia controls for managing the presentation of the multimedia content.

12. The method of claim 10 wherein the application comprises a security application and the content comprises a password sign-in panel.

13. A system for accepting inputs at an information handling system, the system comprising:

a horizontally-disposed display having a touchscreen surface;

a keyboard resting on the touchscreen surface;

a graphics system presenting images at the display; and a keyboard augmentation module interfaced with the graphics system, the keyboard augmentation module including a controller having embedded codes stored in non-transitory memory and interfaced with the touchscreen to determine the keyboard position and interfaced with the graphics system to present keyboard augmentation panels proximate the keyboard, the keyboard augmentation panels accepting touch inputs as an input device for the information handling system;

wherein the keyboard augmentation panels comprise plural panels disposed in a first zone proximate the keyboard and a second zone distal the keyboard, the keyboard augmentation module selecting content for keyboard augmentation panels based at least in part on an active application running on the information handling system so that content associated with the application is presented in the first zone;

wherein first and second zones have a common center point at a hand location of a keyboard, the first zone located within a first radius of the center point, the second zone located outside the first radius and within a second radius of the center point.

14. The system of claim 13 wherein the application comprises a word processor and the content comprises a font selection user interface.

15. The system of claim 13 wherein the keyboard augmentation module is further operable to detect removal of the keyboard and, in response to detecting removal, to present a keyboard at the display in the place of the removed keyboard.

16. The system of claim 13 wherein the keyboard augmentation module is further operable to detect movement of the keyboard across the display surface and, in response to detecting movement, to maintain the keyboard augmentation panels in a constant position relative to the keyboard.

17. The system of claim 13 wherein the keyboard augmentation module is further operable to detect movement of the keyboard to predetermined regions of the display and, in response to detecting movement to the predetermined regions, to minimize the keyboard augmentation panels.

* * * * *